July 3, 1962 A. E. DECAMP 3,041,766
ARTIFICIAL FLOWER STRUCTURE
Filed Nov. 17, 1958 2 Sheets-Sheet 1
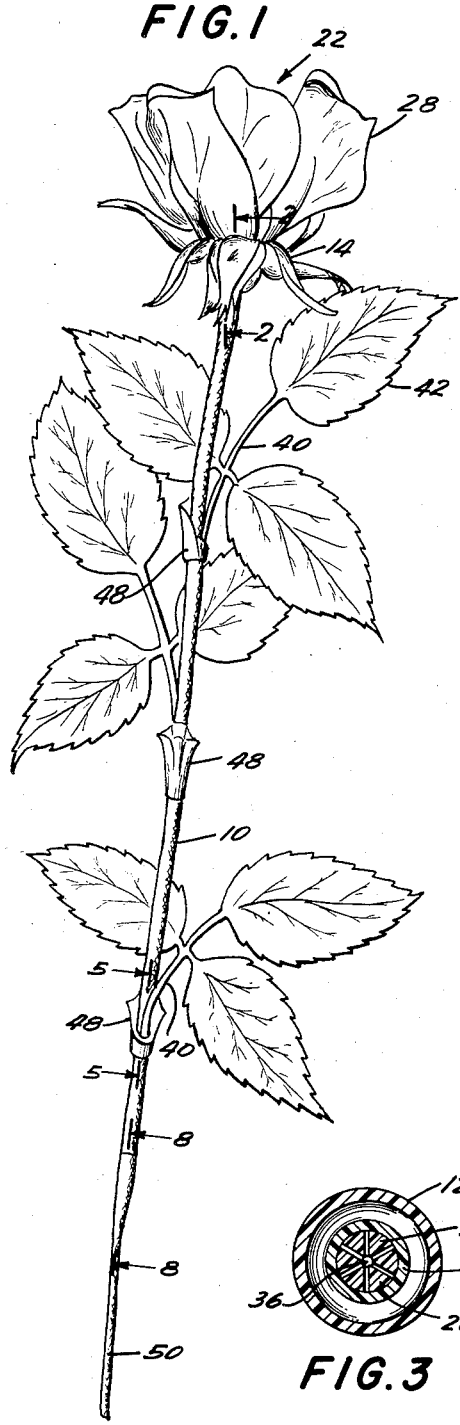
FIG.1
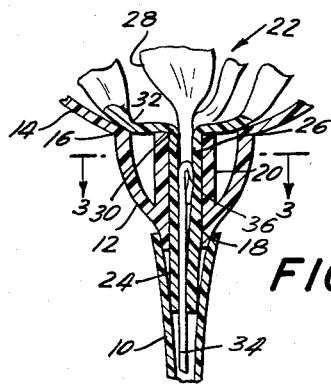
FIG.2
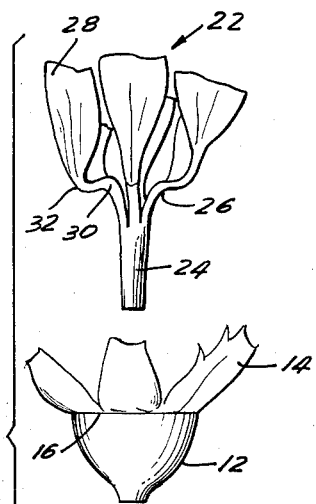
FIG.3
FIG.4
INVENTOR.
ANDRÉ EMILE DECAMP
BY Kane, Dalsimer and Kane
ATTORNEY July 3, 1962 A. E. DECAMP 3,041,766
ARTIFICIAL FLOWER STRUCTURE
Filed Nov. 17, 1958 2 Sheets-Sheet 2

INVENTOR.
ANDRÉ EMILE DECAMP
BY Kane, Dalsimer and Kane

ATTORNEY

3,041,766
ARTIFICIAL FLOWER STRUCTURE
André Emile Decamp, 45 Chemin des Peupliers,
Caluire, France
Filed Nov. 17, 1958, Ser. No. 774,319
2 Claims. (Cl. 41—13)

The present invention relates to an improved artificial flower structure made from a molded plastic material.

An object of this invention is to provide an improved and readily assembled artificial flower structure having certain of its parts and elements individually prefabricated so that they may be conveniently united with respect to one another. Another object is to provide a selectively variable artificial flower structure capable of producing a variety of floral effects while at the same time being capable of being manufactured by mass production techniques and at a relatively decreased cost. A further object is to provide an improved means for attaching and orienting a stem of a flower structure which may bear leaves to another stem which may mount a flower corolla.

In brief, an artificial flower structure fabricated in accordance with the present invention includes a main stem having extending therefrom a plurality of leaf-bearing stems. These leaf-bearing stems include a notched portion for engaging an armature wire extending through the main stem, which is substantially tubular throughout, for properly orienting the leaf-bearing stems with respect to the main stem. A slidable sleeve is mounted on the main stem so that it may be shifted to a position whereby it will function to fix the leaf-bearing stems to this main stem. One end of the main stem may mount a flower simulating structure which comprises a one-piece member suitably molded to represent, when assembled with other prefabricated parts of this flower structure, a flower corolla. This one-piece member includes petal-simulating sections and stem sections, the latter sections being cooperable with a ring-shaped member, which may form part of a flower calyx or part of a flower corolla, for correctly positioning the petal sections. The armature wire employed for orienting the leaf-bearing stems additionally cooperates with the one-piece member simulating a flower corolla for attaching the flower structure to the main stem.

Other objects and advantages will become apparent from the following detailed description which is to be taken in conjunction with the accompanying drawings in which:

FIG. 1 is a perspective view of an artificial flower embodying the teachings of the present invention;

FIG. 2 is a fragmentary sectional view taken along the line 2—2 of FIG. 1;

FIG. 3 is a cross-sectional view taken along the line 3—3 of the FIG. 2;

FIG. 4 is an exploded view of an artificial flower incorporating the teachings of the present invention;

Figure 5:
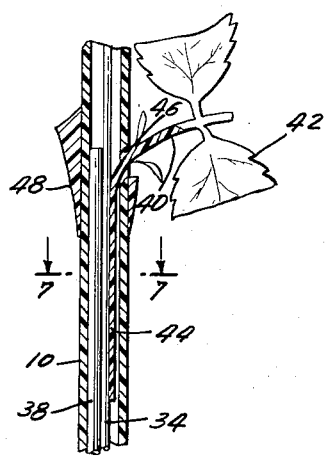
FIG. 5 is a partial sectional view illustrating the coupling of a leaf stem to the main stem of an artificial flower as taken along the line 5—5 of FIG. 1.
Figure 6:
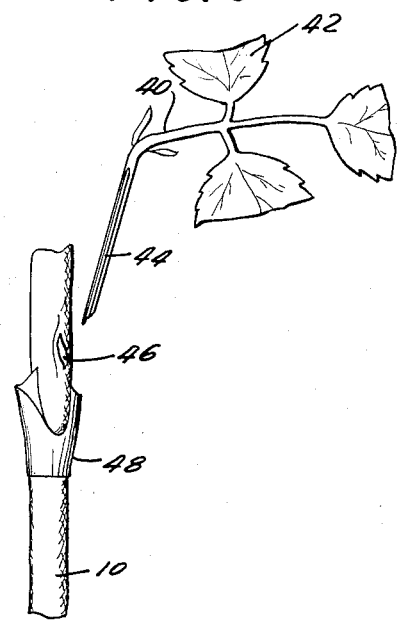
FIG. 6 is an exploded fragmentary view of a leaf stem and its associated sector of the main stem.
Figure 7:
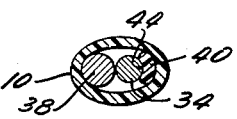
FIG. 7 is a cross-sectional view taken along the line 7—7 of FIG. 5.
Figure 8:
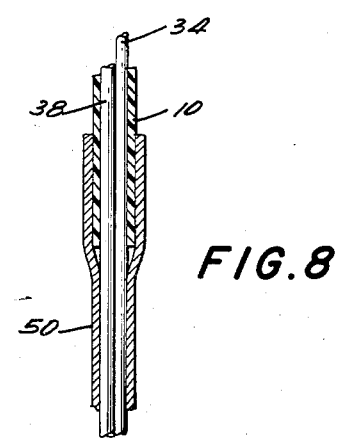
FIG. 8 is a fragmentary sectional view illustrating the base of the main flower stem as taken along the line 8—8 of FIG. 1.

In the drawings an artificial flower is illustrated, and for purposes of the present invention, this flower represents a rose; but it should be understood that the teachings outlined herein are equally applicable to other floral effects and appearances. Additionally, the individual components of this artificial flower structure in most instances are preferably prefabricated from a suitable moldable plastic material.

The illustrated rose structure is composed of an elongated, substantially hollow, tubular member 10 constituting the flower's main stem. The upper end of the main stem 10 embraces a cup-shaped member 12 simulating the calyx of a flower from which extends integral segments 14 representing calyx sepals. The calyx 12 and sepals 14 are united along a fold line 16 which is formed to enable these sepals to project upwardly as well as downwardly with respect to the calyx 12. The calyx 12 is provided with a longitudinally extending bore 18 which may be additionally formed from a coaxial ring-shaped member 20. For purposes of the present description, this ring-shaped member 20 is formed integral with the calyx 12, especially when only a single one-piece member 22 simulating a flower corolla is employed. However, it should be understood that when another one-piece member is utilized to form part of a flower corolla, the ring-shaped member 20 may be an integral part of such other one-piece member. If another one-piece member is still desired, it will be formed with an integral ring-shaped section possessing suitable dimensions such that it will surround the exterior of the ring-shaped sector of the one-piece member which will surround the one-piece corolla 22.

The flower corolla 22 includes a ring-shaped or hollow tubular section 24 from which extends a plurality of stem sections 26. A plurality of petal-simulating sections 28 each extend from the terminal ends of the stem sections 26. The tubular section 24 is adapted to be disposed in bore 18 of calyx 12 with portions thereof projecting beyond the base of this calyx 12 to extend into the interior of the main stem 10. The stem sections 26 present a cross-section which is substantially triangular throughout so that when the stem sections 26 are within bore 18 they will be united to form a substantially uniform extension of tubular section 24. The stem sections 26 are formed with a fold 30 which functions to extend the petal sections 26 outwardly with respect to the axis of the tubular section 24. This fold 30 additionally prevents the flower corolla 22 from projecting further into the bore 18 and thus detrimentally affect the proper positioning of the petal sections 28. An arcuate bend 32 is formed adjacent the lower end of the petal sections 28 to further enable the petal sections 28 to present the desired cluster of flower petals.

An armature wire 34 having a relatively enlarged head 36, which may be formed by simply bending the upper end of wire 34 on itself, is inserted through the bore of the flower corolla 22, and consequently bore 18 of calyx 18, into the hollow, substantially tubular main stem 10. The wire head 36 may be inserted into the bore of the corolla 22 such that it frictionally engages the inner walls of the united petal sections 26 and even the upper zone of the interior walls of the tubular section 24. As will be appreciated, the head 36 along with its mounting armature wire 34 cooperate with the substantially hollow main stem 10 to fix and orient the above-described flower parts with respect to one another. A stiffening wire 38 may be additionally included with in the hollow main stem 10 to supply the desired rigidity thereto, especially along the base of this stem.

One or more stems 40 bearing a plurality of leaves 42 may be coupled with the main stem 10. The base of the leaf-bearing stem 40 is preferably provided with a longitudinally extending groove 44 which is suitably notched in the base of the stem depending on the desired orientation thereof with respect to the main stem 10. In this connection, the base of the leaf-bearing stem 40 is inserted through a suitably formed aperture 46 in the walls of the main stem 10 such that the surfaces of the leaf-bearing stem 40 which define groove 44 embrace the exterior of the armature wire 34. Thus it will be apparent that when the mating surfaces of the base of the leaf-bearing stem 44 and the armature wire 34 interengage, the leaves 42 will assume a particular orientation with respect to the remainder of the flower structure. A slidable sleeve 48 is telescopically positioned on the main stem 10 adjacent the formed aperture 46 to cooperate in affixing the leaf-bearing stem 42 to main stem 10. When the leaf-bearing stem 40 is properly oriented with respect to the main stem 10, the sleeve 48 is displaced to either increase the friction between the base of the leaf-bearing stem 40 and its associated sector of the armature wire 34 or displaced even further to create a wedge-tight frictional engagement of zones of stem 40 and the exterior of the main stem 10.

To prevent undesirable displacement of armature wire 34 and wire 38 with respect to the main stem 10, a suitable length of sheet material 50 may be employed to connect these parts together. This sheet material 50 may simply be paper ordinarily employed for such purposes. If desired, this paper may have a suitable application of wax to offset detrimental effects of moisture and water. Furthermore, if it is considered necessary, the sheet material 50 may assume the form of a tape which may comprise a suitable backing having one face thereof coated with a suitable adhesive.

The present invention is obviously not limited to the artificial flower structure described and illustrated, but on the contrary is intended to cover a species of forms, materials and dimensions incorporating the present teachings. It should be apparent at this time that an artificial flower structure is thus provided from relatively inexpensive prefabricated parts which are readily assembled to be fixedly united to one another in the finally assembled flower structure. Thus, among others, the forementioned objects and advantages are most effectively attained, and accordingly it is intended that the scope of this invention be defined by the appended claims.

I claim:

1. An artificial flower comprising a substantially hollow tubular member simulating a stem of a flower, an armature wire disposed therein, flower corolla means coupled with said tubular member and said armature wire, said tubular member having an aperture communicating with the interior thereof on the side wall of the stem, a second stem having a first section thereof within said tubular member and a further section integral with said first section projecting through said aperture externally of said tubular member, and surfaces of said first section and said armature wire interengaging to predeterminately orient said second stem with respect to said tubular member, said first section being provided with a longitudinally extending groove for embracing the external surface of said armature wire, and means simulating a leaf extending from said second section.

2. The invention in accordance with claim 1 wherein a slidable sleeve is in telescopic relationship with respect to said tubular member, said sleeve being disposed adjacent said aperture and said second stem and being cooperable to wedge said second stem to said tubular member.

References Cited in the file of this patent

UNITED STATES PATENTS

| | | |
|---|---|---|
| 891,301 | Spreen | June 23, 1908 |
| 1,730,628 | Rogers | Oct. 8, 1929 |
| 2,749,639 | D'Angillo | June 12, 1956 |

FOREIGN PATENTS

| | | |
|---|---|---|
| 759,130 | Great Britain | Oct. 10, 1956 |